(12) United States Patent
Becker et al.

(10) Patent No.: US 7,537,268 B2
(45) Date of Patent: May 26, 2009

(54) ADJUSTABLE ARMREST (75) Inventors: Wolfgang Becker, Moers (DE); Harald John, Dusseldorf (DE); Hans-Helmut Mieglitz, Monheim am Rhein (DE); Thorsten Meyer, Krefeld (DE); Alexander Schidan, Solingen (DE)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 98 days.

(21) Appl. No.: 11/597,988

(22) PCT Filed: May 30, 2005

(86) PCT No.: PCT/EP2005/052452

§ 371 (c)(1),
(2), (4) Date: Nov. 30, 2006

(87) PCT Pub. No.: WO2005/118335

PCT Pub. Date: Dec. 15, 2005

(65) Prior Publication Data

US 2008/0012415 A1    Jan. 17, 2008

(30) Foreign Application Priority Data

Jun. 1, 2004    (DE) .................. 10 2004 026 928

(51) Int. Cl.
*B60N 2/48*    (2006.01)
(52) U.S. Cl. .................. 296/153; D12/421; 296/1.09; 297/411.35
(58) Field of Classification Search .................. 248/118, 248/118.3; 296/1.09, 153; 297/411.2, 411.35, 297/411.36, 411.37, 411.38; D12/421
See application file for complete search history.

(56) References Cited

U.S. PATENT DOCUMENTS 2,325,292 A    7/1943    Westrope (Continued)

FOREIGN PATENT DOCUMENTS

DE    85 28 043 U1    1/1986

(Continued)

OTHER PUBLICATIONS

International Search Report for PCT/EP2005/052452, date of mailing Oct. 21, 2005, 2 pages.

(Continued)

*Primary Examiner*—Glenn Dayoan
*Assistant Examiner*—Paul A Chenevert
(74) *Attorney, Agent, or Firm*—Foley & Lardner LLP (57) ABSTRACT

A door having an adjustable armrest has a curved inner trim in the region in which the adjustable armrest is arranged. The adjustable armrest follows the curvature of the door trim with its movement so that the gap between the inner trim and the door is always substantially constant to reduce related drawbacks. The adjustable armrest includes manual and automatic adjustment mechanisms and provision for a folding storage box.

20 Claims, 8 Drawing Sheets

U.S. PATENT DOCUMENTS

| | | | |
|---|---|---|---|
| 3,666,315 A | | 5/1972 | Reimann |
| 4,145,020 A | * | 3/1979 | Webster ..................... 248/161 |
| 4,453,760 A | * | 6/1984 | Hira ........................ 296/37.13 |
| 4,619,478 A | * | 10/1986 | Heimnick et al. ........... 296/153 |
| 4,659,135 A | * | 4/1987 | Johnson ..................... 296/153 |
| 5,527,084 A | | 6/1996 | Scherf |
| 5,816,645 A | | 10/1998 | Grimes |
| 5,964,497 A | * | 10/1999 | Wiles ........................ 296/153 |
| 6,568,743 B1 | * | 5/2003 | Jayasuriya et al. .......... 296/153 |
| 6,837,544 B2 | * | 1/2005 | Bornchen et al. ...... 297/411.21 |
| 6,905,163 B2 | * | 6/2005 | Bornchen et al. .......... 296/153 |
| 7,144,067 B2 | * | 12/2006 | Gramss ..................... 296/153 |
| 7,296,855 B1 | * | 11/2007 | Link ......................... 297/353 |
| 2002/0109387 A1 | * | 8/2002 | Noiseux ................ 297/411.37 |
| 2004/0164577 A1 | * | 8/2004 | Shabana et al. ............ 296/1.09 |
| 2006/0163933 A1 | * | 7/2006 | Radu et al. ............. 297/411.35 |
| 2007/0080560 A1 | * | 4/2007 | Sommer et al. ............. 296/153 |

FOREIGN PATENT DOCUMENTS

| | | | |
|---|---|---|---|
| DE | 4002242 | | 8/1991 |
| DE | 10060857 A1 | * | 6/2002 |
| DE | 10104077 A1 | * | 8/2002 |
| DE | 101 10 330 A1 | | 10/2002 |
| DE | 201 20 958 U1 | | 5/2003 |
| DE | 103 58 043 A1 | | 7/2005 |
| EP | 1 256 484 A1 | | 11/2002 |
| FR | 2560127 A1 | * | 8/1985 |
| FR | 2 749 233 A1 | | 12/1997 |
| WO | WO 02/060719 A2 | | 8/2002 |

OTHER PUBLICATIONS

German Examination Report dated Nov. 8, 2005, 6 pages.

* cited by examiner

ADJUSTABLE ARMREST

CROSS-REFERENCE TO RELATED PATENT APPLICATIONS

This Application claims priority to, and incorporates herein by reference, PCT Patent Application PCT/EP2005/052452, filed May 30, 2005, and German Priority Application 102004026928.9, filed Jun. 1, 2004 including the specification, drawings, claims and abstract, which is incorporated herein by reference in its entirety.

BACKGROUND

Generally, adjustable armrests on the door of a motor vehicle are known. It is also generally known for the door of a motor vehicle to include an adjustable armrest.

Nowadays, motor vehicles occasionally comprise height adjustable armrests which are arranged on the trim of the passenger doors. Such a height adjustable armrest is, for example, known from DE 40 02 242 A1. As the door trim nowadays are frequently curved in the Y-Z plane, the height adjustable armrests according to the prior art have the drawbacks that a gap between the door trim and the armrest is altered by the adjustment of the armrest which results in drawbacks such as potential risk of injury and a susceptibility to soiling.

It was, therefore, the object to provide an adjustable armrest which does not have the drawbacks of the prior art.

SUMMARY

In one exemplary embodiment, an armrest is carried out in at least one direction along a curved path, the adjustment being able to be a height adjustment, i.e. in the Z direction, transversely to the direction of travel (Y direction) and/or an adjustment in, and counter to, the direction of travel i.e. in the X direction of the vehicle, and a combination of the three, preferably however only two, adjustments.

It was extremely surprising for the person skilled in the art that the adjustable armrest has a considerably reduced risk of injury and a reduced susceptibility to soiling, than height adjustable armrests according to the prior art.

In one exemplary embodiment, the adjustment is preferably carried out in the Z direction and/or in the Y direction along a circular path. The armrest is further preferably arranged in front of a door trim, i.e. toward the passenger compartment and follows the contour of the door trim during its adjustment. This embodiment has the advantage, in particular, that the gap between the armrest and the door trim always remains the same, whereby potential risk of injury, for example crushing or squashing, is substantially avoided.

The adjustment of the armrest may be carried out both manually and automatically. In one exemplary embodiment an automatic adjustment is provided with either an electro-mechanical and/or electro-pneumatic drive.

In one exemplary embodiment, an mechanical adjustment device is preferably carried out by a toothed rack/gearwheel drive, a threaded spindle drive, a Bowden cable or in one exemplary electro-pneumatic embodiment, a blow pump drive.

In particular with a manual adjustment of the armrest, it is advantageous if the adjustment is assisted by a spring or biasing means which preferably acts counter to the force of gravity.

In one exemplary embodiment, the drive means and/or the biasing means are arranged between the structure of the door and the door trim.

In a further exemplary embodiment, the drive means and/or the biasing means are arranged in the adjustable armrest itself.

The adjustable armrest preferably comprises a guide which may comprise a latching mechanism. The guide is preferably curved and preferably substantially follows the contour of the inner trim, along which the armrest may be adjusted.

The guide and/or the armrest are further preferably designed such that they may be displaced and/or deformed during an impact to the vehicle, so that they at least partially absorb the impact energy occurring during such an incident.

In one embodiment, the armrest comprises a hollow space which may preferably be used as a storage compartment and as an energy absorption member. A heating element is further preferably arranged in the arm support region of the armrest.

In one embodiment, a door is disclosed which comprises an adjustable armrest of the exemplary embodiments. It was extremely surprising and unexpected for the person skilled in the art that the door has a reduced susceptibility to soiling and a reduced potential risk of injury. In one exemplary embodiment, the door may be manufactured easily and economically by means of a modular structure, the door may be equipped both with a manual adjustment and with an automatic adjustment of the armrest.

The door may have the armrest aligned in front of the trim i.e. toward the passenger compartment wherein the trim includes slots, preferably support and/or central slots through which the adjustable armrest is guided and/or the drive of the height adjustable armrest is carried out. The armrest particularly preferably masks these slots so that the door appears visually attractive.

In one exemplary embodiment, a method for the assembly of the door includes placing the armrest on the door structure and including appropriate support elements after the assembly of the trim.

DETAILED DESCRIPTION

Figure 1:
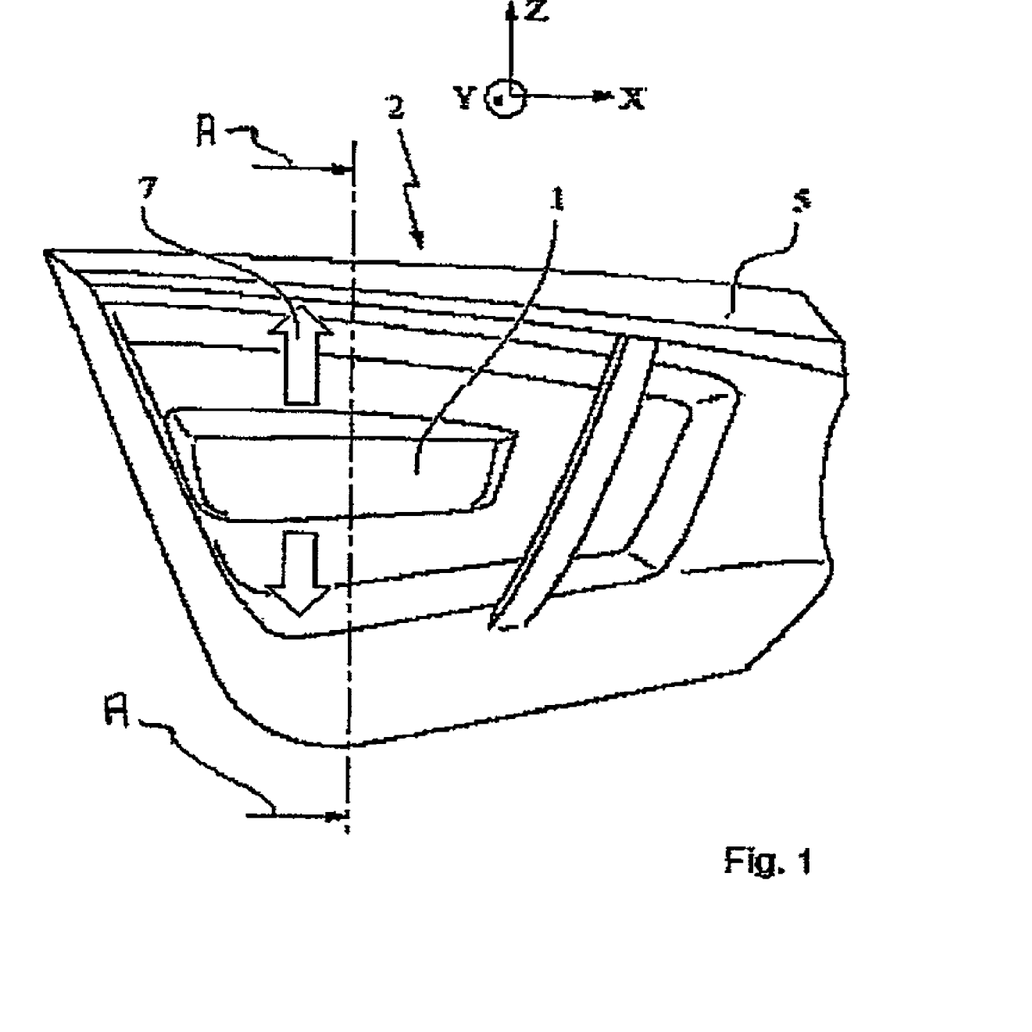
FIG. 1 shows one embodiment of a door with a height adjustable armrest.

FIG. 1 shows a door 2 with a height adjustable armrest 1. The door 2 comprises an inner trim 5 which is curved in the Y-Z plane, in the region in which the armrest 1 is arranged. The armrest follows this curvature with its outward and/or downward movement, so that the gap between the inner trim and the door is always substantially constant. As a result, the gap may be of very narrow design which reduces the susceptibility to soiling and the potential risk of injury, for example by pinching the fingers.

Figure 2:
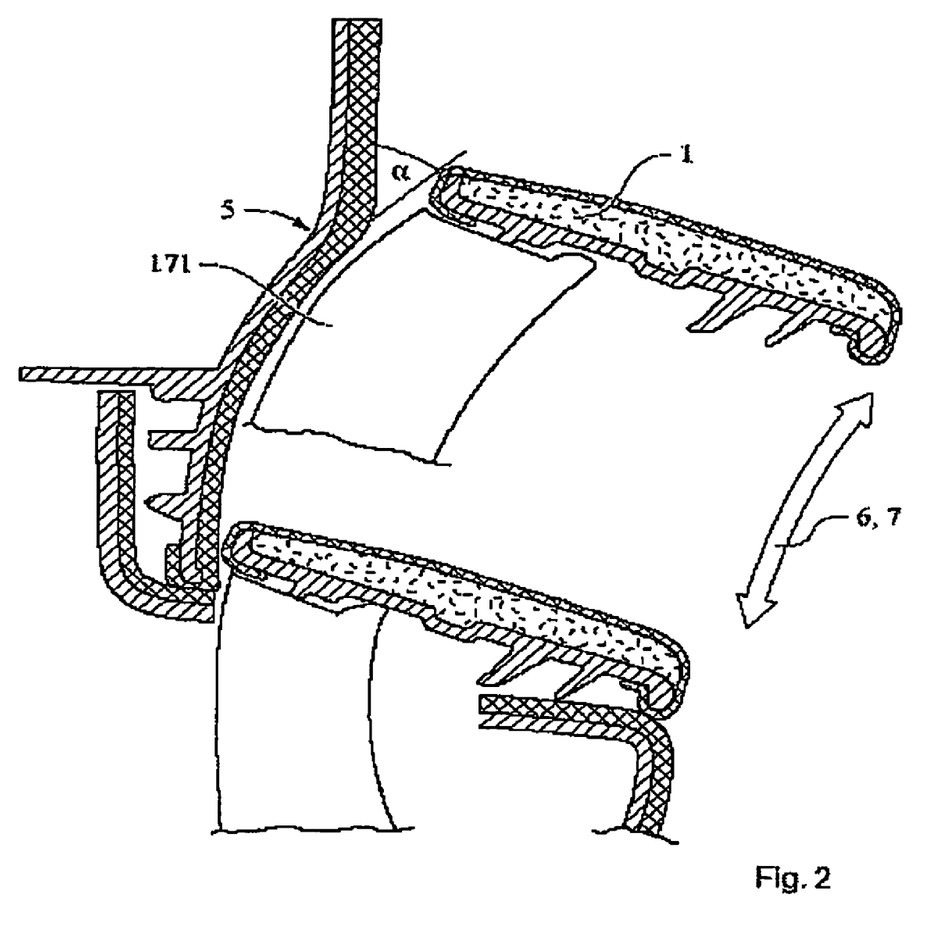
FIG. 2 shows a further embodiment of the door.

FIG. 2 shows a further embodiment of the inner trim 5 of the door 2, wherein the armrest 1 and a guide element 171 are shown. In the present case, the armrest 1 is not only adjusted in its height (Z direction) but simultaneously also in the Y direction, which is shown by the arrow 6, 7. As a result, the angle α between the door inner trim 5 and the armrest 1 remains substantially constant, which also reduces the potential risk of injury.

Figure 3:
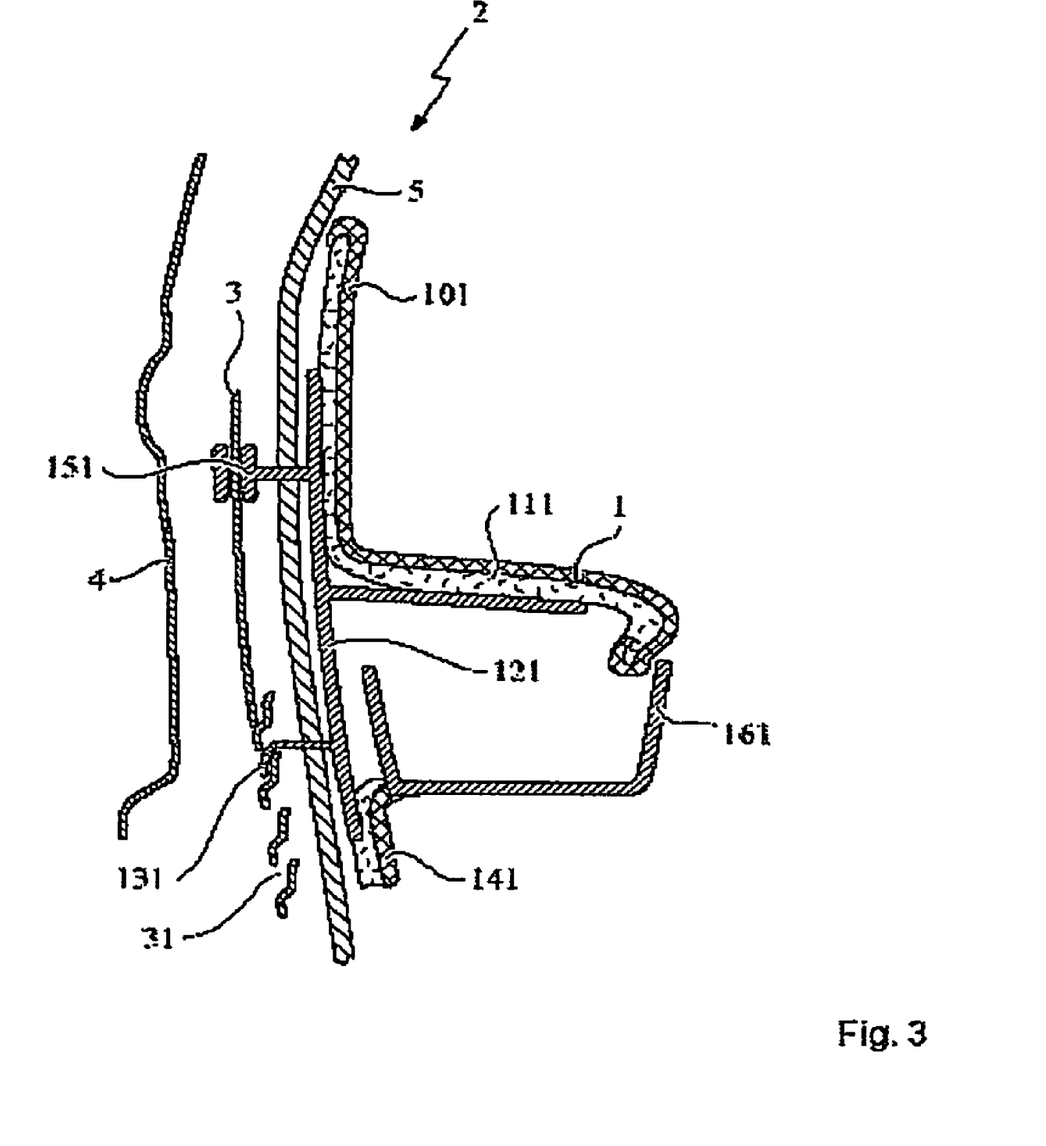
FIG. 3 shows a section through the door according to FIG. 1.

FIG. 3 shows a section through the door 2 of FIG. 1 taken in the direction of the cut-line in FIG. 1. A door trim 5 is arranged at a distance on the structure 4 of the door 2, in front of which a height adjustable armrest 1 is located. The height adjustable armrest 1 comprises an upper cover 101 which also serves as an arm support and which masks the slots 51 (see FIG. 5). Moreover, the armrest 1 comprises a foam insert 111 in the horizontal arm support region, beneath which foam insert 111 a structure 121 with supporting arms is located. A folding storage box 161 may serve as a storage compartment or as a storage space for the drive or the like. In the lower region, the height adjustable armrest 1 comprises a lower cover 141. The armrest 1 is arranged to be movable upward and downward on a guide rail 3, by means of the guide bushings 151 which preferably have an articulated joint. The latching lever 131 which is arranged on the armrest 1, cooperates with latching positions 31 which are arranged on the guide rail 3 and fixes the armrest 1 in a desired position. The person skilled in the art recognizes that the guide rail 3 is curved and extends substantially parallel to the inner trim 5, so that the armrest 1 substantially follows the contour of the inner trim 5 during its upward and downward movement.

Figure 4:
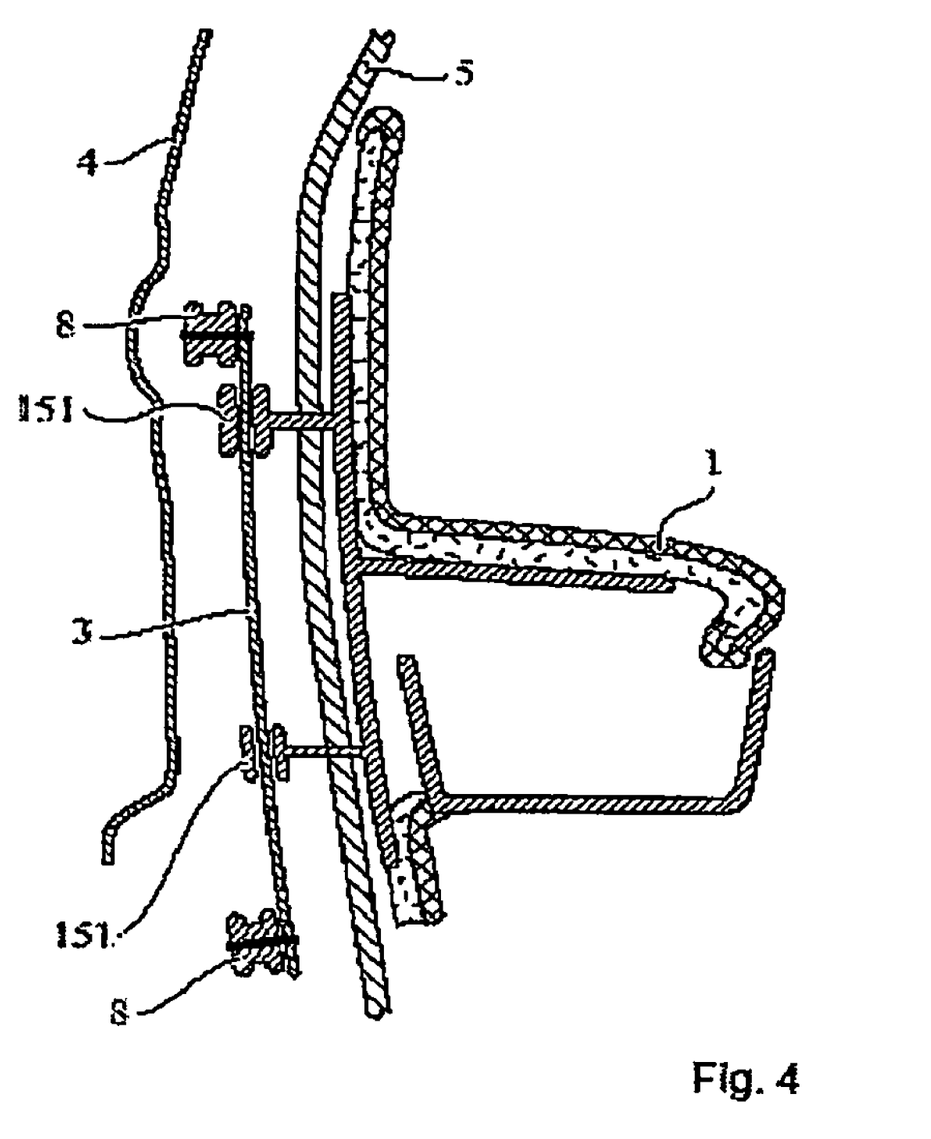
FIG. 4 shows a further embodiment of the height adjustable armrest according to FIG. 3.

FIG. 4 substantially shows the armrest 1 according to FIG. 3, in the present case the displacement of the armrest being carried out via a wire cable on rollers 8.

Figure 5:
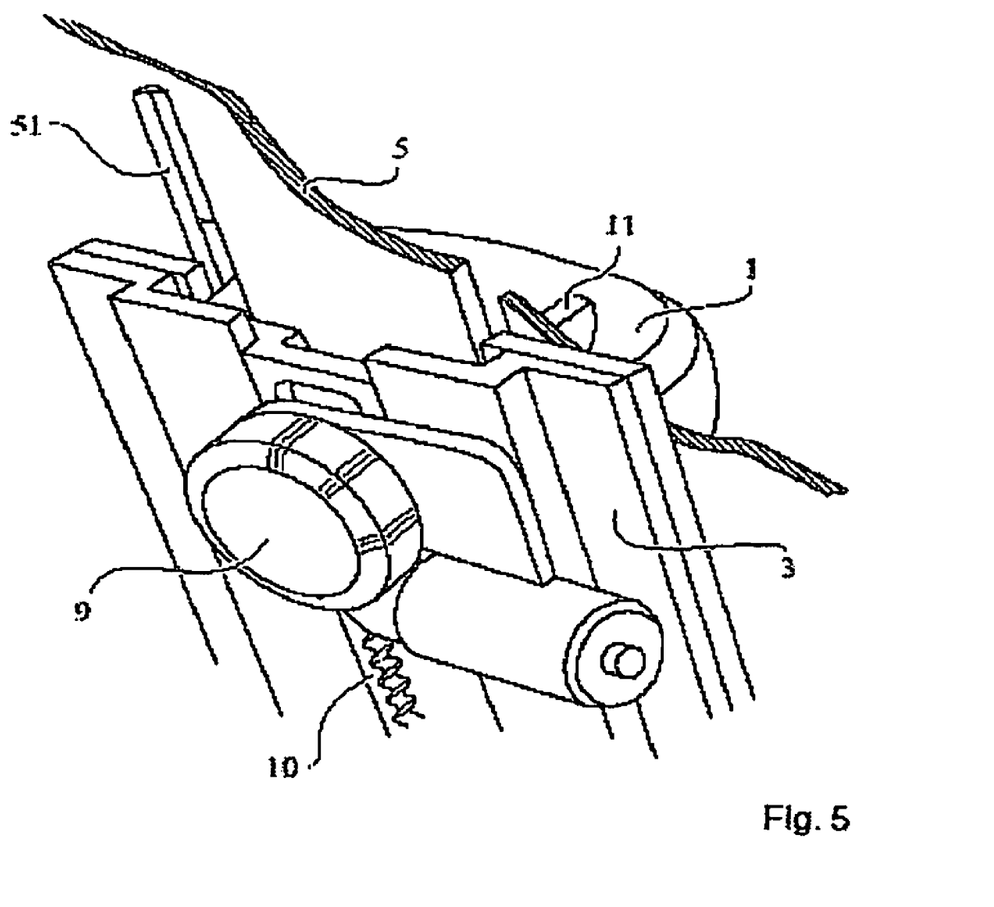
FIG. 5 shows an automatic drive with a gearwheel/toothed rack combination.

FIG. 5 shows a further embodiment of the armrest 1. A drive or motor 9 is arranged behind the trim 5 and drives a gearwheel (not shown) which cooperates with a toothed rack 10. The toothed rack 10 drives supporting arms 11 which are vertically guided in the guide 3 and which are connected to the armrest 1. The door trim 5 comprises slots 51 through which the supporting arms 11 project.

Figure 6:
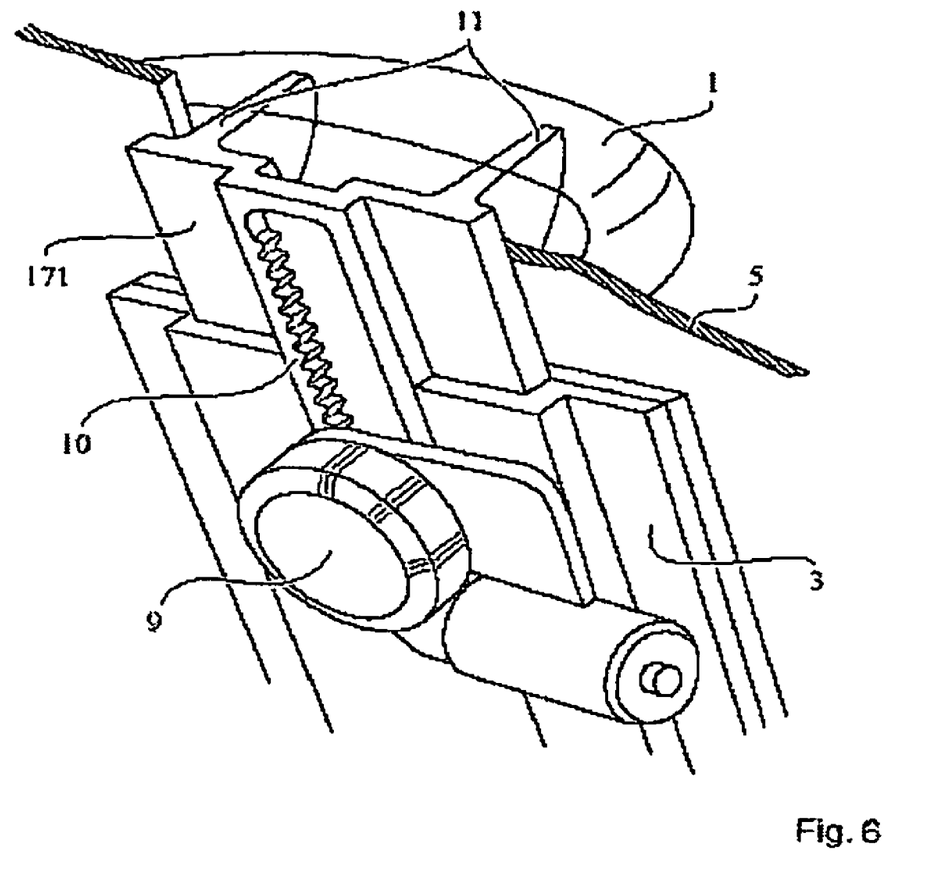
FIG. 6 shows a height adjustable armrest according to FIG. 5, the height adjustable armrest being held by supporting arms.

FIG. 6 substantially shows the drive of the armrest 1 according to FIG. 5, in the present case the door trim 5 not comprising any slots but comprising a recess in which the guide element 171 is arranged. It may be seen once again that the supporting arms 11 are guided via the guide element 171 and the guide 3.

Figure 7:
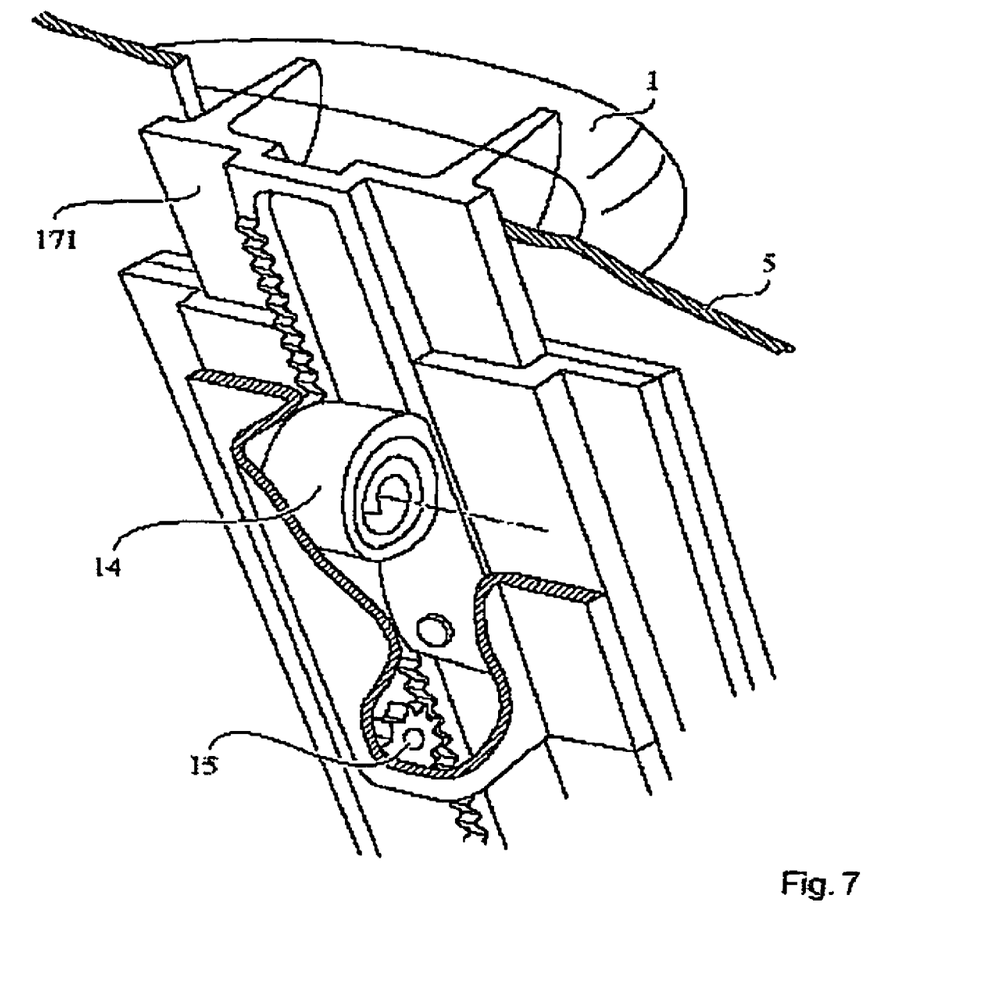
FIG. 7 shows a manual adjustment of the height adjustable armrest.

FIG. 7 shows a possible arrangement for manual adjustment of the armrest 1. The manual adjustment is assisted by a scroll spring 14 and comprises a brake 15 (which may be made of silicon) which stabilizes the armrest 1 during the movement and in its position.

Figure 8:
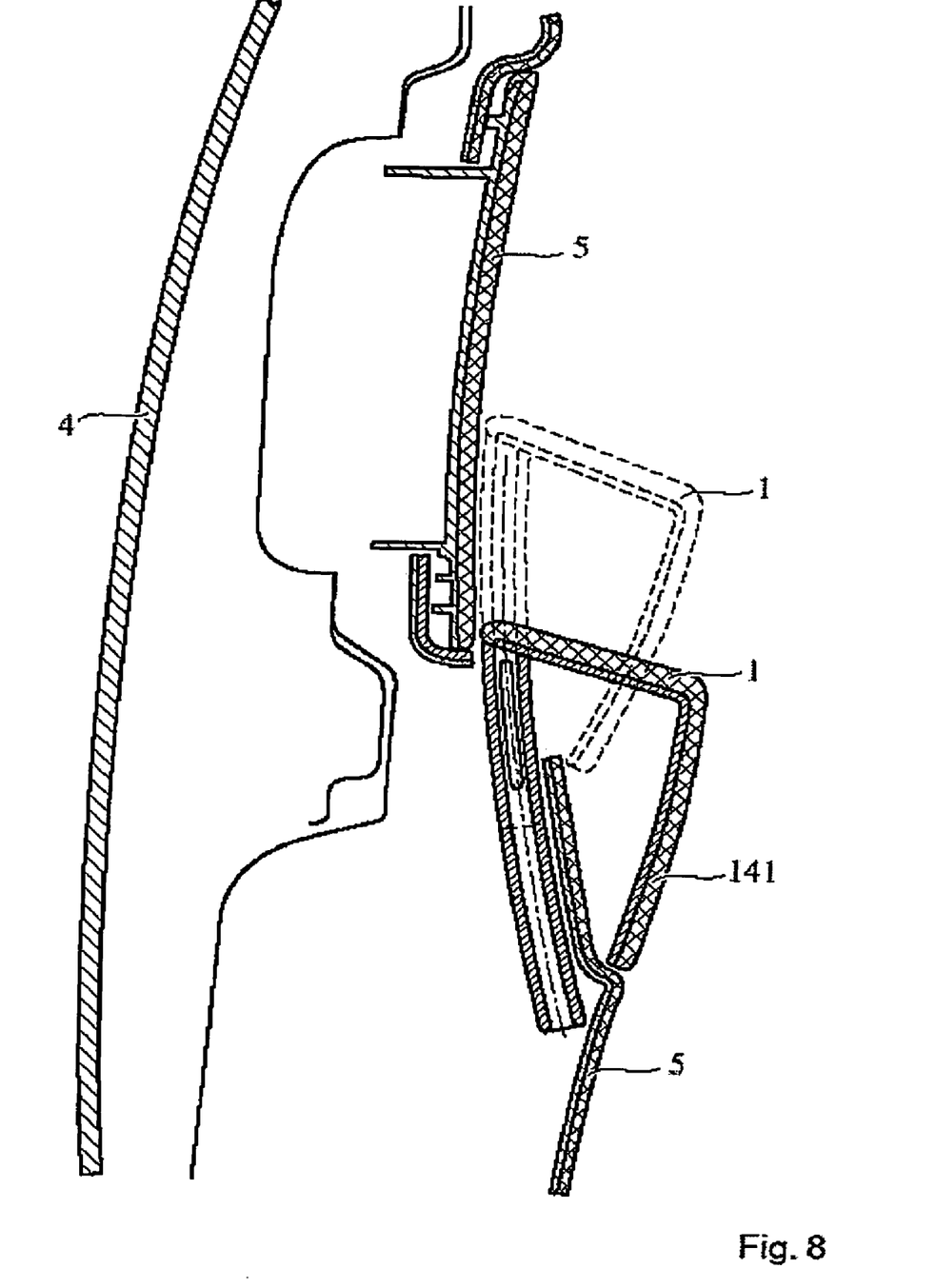
FIG. 8 shows a further embodiment of the height adjustable armrest.

FIG. 8 shows a further embodiment of the armrest 1 and the door. In the present case, the armrest 1 is shown in two positions, the armrest 1 being shown in the upper position in phantom. The armrest 1 comprises an opening in the lower region which receives and overlaps with the door trim 5. Moreover, the lower cover 141 has a particularly elongate design so that even in the uppermost position no gap is present between the lower cover 141 and the door trim 5.

The invention claimed is:

1. An improved adjustable armrest for a door of a motor vehicle, wherein the improvement comprises that the adjustable armrest may be height adjustable and adjustable transversely to the direction of travel of the vehicle and the armrest carries out the adjustment, at least in one direction, along a curved path, further comprising a spring means arranged between a structure of the door and a door trim, the spring means for assisting adjustment of the armrest.

2. The impproved adjustable armrest of claim 1, wherein the adjustable armrest is fixed to the door.

3. An improved adjustable armrest for a door of a motor vehicle, wherein the improvement comprises that the adjustable armrest may be height adjustable and adjustable transversely to the direction of travel of the vehicle and the armrest carries out the adjustment, at least in one direction, along a curved path, further comprising a storage compartment and an energy absorption member arranged in the armrest.

4. The improved adjustable armrest of claim 3, wherein the adjustable armrest is fixed to the door.

5. An improved adjustable armrest for a door of a motor vehicle, wherein the improvement comprises that the adjustable armrest may be height adjustable and adjustable transversely to the direction of travel of the vehicle and the armrest carries out the adjustment, at least in one direction, along a curved path, further comprising an electromechanical drive for adjusting the armrest and a spring means for assisting adjustment of the armrest.

6. The improved adjustable armrest of claim 5, wherein the spring means is arranged in the armrest.

7. The improved adjustable armrest of claim 5, wherein the curved path is a circular path.

8. The improved adjustable armrest of claim 5, wherein the adjustable armrest is fixed to the door.

9. An improved adjustable armrest for a door of a motor vehicle, wherein the improvement comprises that the adjustable armrest may be height adjustable and adjustable transversely to the direction of travel of the vehicle and the armrest carries out the adjustment, at least in one direction, along a curved path, further comprising a guide with a latching mechanism for latching the adjustable armrest in place.

10. The improved adjustable armrest of claim 9, wherein the guide is curved.

11. The improved adjustable armrest of claim 9, wherein the armrest and the guide may be displaced or deformed during an accident.

12. The improved adjustable armrest of claim 9, wherein the curved path is a circular path.

13. The improved adjustable armrest of claim 9, wherein the adjustable armrest is fixed to the door.

14. An improved adjustable armrest for a door of a motor vehicle, wherein the improvement comprises that the adjustable armrest may be height adjustable and adjustable transversely to the direction of travel of the vehicle and the armrest carries out the adjustment, at least in one direction, alone a curved path, wherein the adjustable armrest is arranged in front of a door trim and the armrest follows the contour of the door trim during adjustment.

15. The improved adjustable armrest of claim 14, wherein the curved path is a circular path.

16. The improved adjustable armrest of claim 14, further comprising an electromechanical drive for adjusting the armrest.

17. The improved adjustable armrest of claim 16, wherein the electromechanical drive is selected from the group consisting of a toothed rack/gearwheel drive, or a Bowden cable drive.

18. The improved adjustable armrest of claim 14, wherein the adjustable armrest is fixed to the door.

19. The improved adjustable armrest of claim 18, wherein the door trim comprises a slot for allowing adjustment of the armrest.

20. The improved adjustable armrest of claim 19, wherein the armrest masks the slot.

* * * * *